Jan. 13, 1959   H. R. BILLETER   2,868,038
INFINITELY VARIABLE PLANETARY TRANSMISSION
Filed May 26, 1955
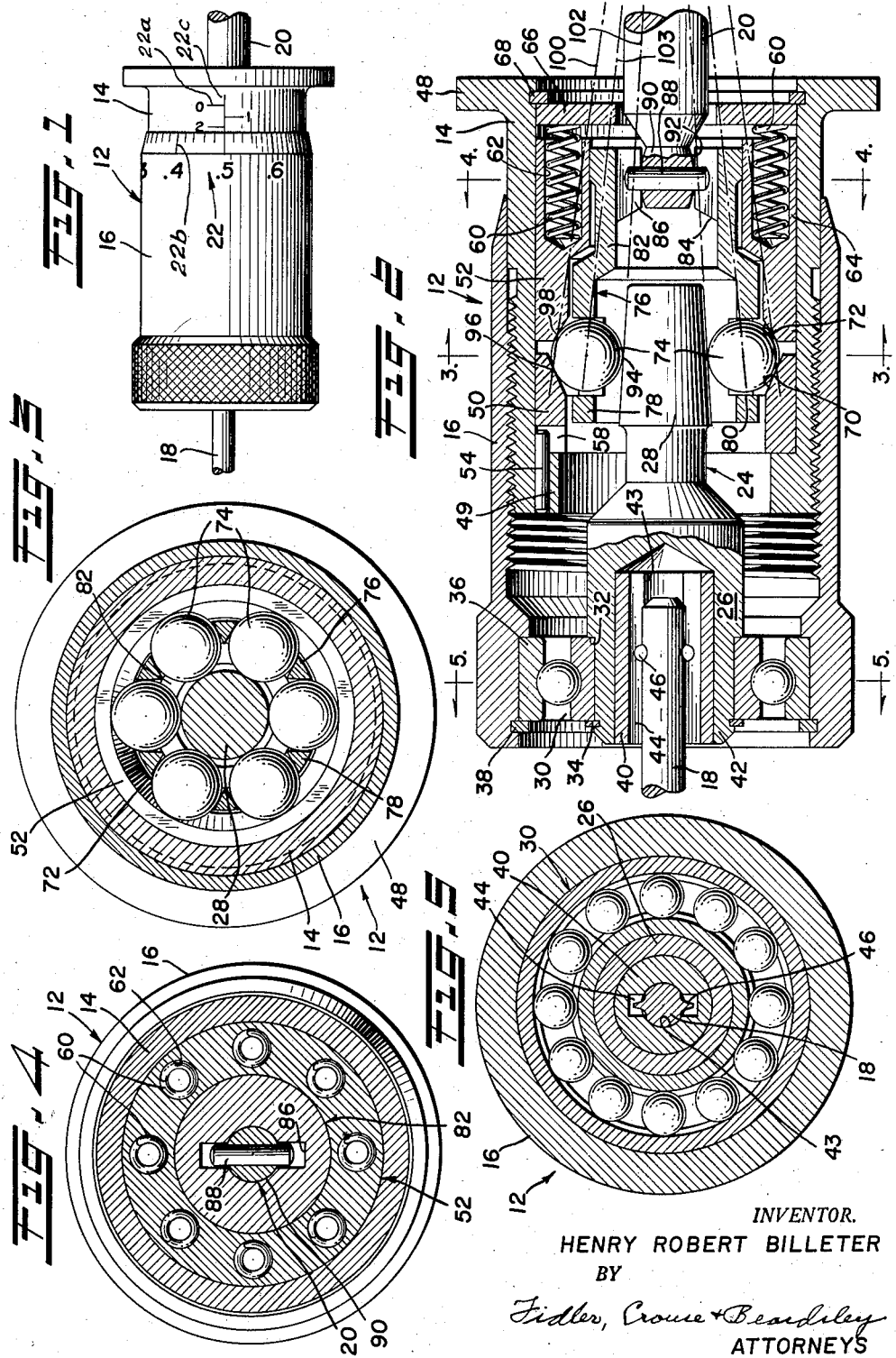
INVENTOR.
HENRY ROBERT BILLETER
BY
Fidler, Crouse + Beardsley
ATTORNEYS

United States Patent Office 2,868,038
Patented Jan. 13, 1959

2,868,038

INFINITELY VARIABLE PLANETARY TRANSMISSION

Henry Robert Billeter, Deerfield, Ill., assignor, by mesne assignments, to Liquid Controls Corporation, North Chicago, Ill., a corporation of Illinois Application May 26, 1955, Serial No. 511,206

3 Claims. (Cl. 74—796)

The present invention relates to an infinitely variable planetary transmission, and has to do more particularly with such a mechanism wherein the drive ratio is continuously variable throughout a predetermined range of adjustment.

The invention finds particular application in adjusters for use in connection with flow meters employed in metering liquid products handled in bulk such as petroleum products, milk, chemicals and the like, although the invention is not limited to such application. Customarily, flow meters include a positive liquid displacement device through which the liquid flows to rotate a measuring means such as a rotor or rotors and a counter driven thereby. In such devices there is leakage of the liquid being metered past the seals and it is customary to provide an adjuster which is connected between the liquid displacement device and the counter, whereby the drive ratio between these components of the meter can be adjusted so that the counter will accurately indicate in the desired volumetric units (e. g., gallons) the number of such units which pass through the liquid displacement device. Such adjustment is necessary not only when the meter is first put into operation but also whenever the volume of liquid passing through the liquid displacement device per cycle varies, as for example, where a change is made in the product being metered.

An object of the invention is to provide an improved variable drive mechanism.

Another object is to provide an adjuster for varying the drive ratio between an input shaft and an output shaft which is simple and easy to operate and is effective for providing a continuously variable adjustment in the drive ratio.

Another object is to provide an adjuster for varying the drive ratio between an input shaft and an output shaft which adjuster has a direct reading scale indicating the percentage variation in the drive ratio effected by the adjuster.

Another object is to provide an adjuster for varying the drive ratio between an input and an output shaft which adjuster is provided with a micrometer like scale indicating in decimals the percentage variation in the drive ratio effected by the adjuster.

Another object is to provide a variable drive mechanism which is in the nature of a continuously variable planetary motion transmitting means.

A still further object is to provide a variable drive mechanism utilizing bearing balls as an essential component of the motion transmitting means between the input and output elements.

Still another object is to provide a variable drive mechanism utilizing a ball bearing type of construction having inner and outer races, generally analogous in principle of operation to a planetary gear system, and in which the effective dimensional relation between the two races can be continuously varied.

Another object is to provide a variable ratio drive mechanism which is completely reversible and in which backlash is virtually eliminated, whereby the device is unusually effective as an adjuster in connection with liquid meters.

A further object is to provide a variable drive mechanism utilizing bearing balls for transmitting the driving force in which the balls are supported in the races so constructed and arranged that the balls perform a perfect rolling action between the races without any slipping effect.

Another object is to provide a variable drive mechanism having ball bearing motion transmitting means in which the balls necessarily bear on at least three points, and wherein the bearing points for the balls are provided on adjustable members so shaped that in all positions of those members made for varying the speed of the drive they establish pitch diameters on the members of such dimensions that the balls roll therein without slipping.

Other objects and advantages of the invention will appear from the following detailed description taken in conjunction with the accompanying drawings in which:

Fig. 1 is an elevational view of a preferred embodiment of the present invention;

Fig. 2 is an enlarged axial sectional view of the mechanism of Fig. 1;

Fig. 3 is a cross-sectional view taken on line 3—3 of Fig. 2;

Fig. 4 is a cross-sectional view taken on line 4—4 of Fig. 2; and

Fig. 5 is a cross-sectional view taken on line 5—5 of Fig. 2.

Referring now in detail to the drawings which show one form of device embodying the principles of the present invention, attention is directed first to Fig. 1 showing the device as a whole. This view shows the device in full scale from which it will be noted that it is of small size and well adapted for small installations such as in connection with meters for measuring bulk liquid materials.

The mechanism as viewed in Fig. 1 includes a housing 12, made up of a generally tubular inner housing member 14, and a generally tubular outer housing member or thimble 16, an input shaft 18, and an output shaft 20. The housing members 14 and 16 are threadedly connected, as seen in Fig. 2, whereby relative axial movement therebetween may be produced by turning the thimble 16 on the inner housing member 14. Upon adjustment of the thimble 16 on and relative to the inner housing member 14, in one direction or the other, the drive ratio between the input and output shaft is varied in a manner to be explained fully hereinafter. A suitable micrometer type scale with indicia 22 is provided on the housing members for indicating their relative positions of adjustment and the drive ratio between the input and output shafts, as hereinafter explained.

Mounted in the thimble 16 is an inner ball race means 24, having a main body portion 26 forming the means by which it is mounted, and an extension 28 forming the inner race proper. The extension 28 has a conic surface tapering toward its inner end. Upon axial movement of the thimble 16, relative to the inner housing member the inner ball race 28 moves correspondingly in an axial direction for producing the variation in the drive ratio between the shafts, all as will be brought out more fully hereinafter.

The race means 24 is mounted in the thimble 16 by a ball bearing 30 of known type in which the body portion 26 is directly mounted, the ball bearing being confined between a shoulder 32 on the body and a retainer ring 34. The bearing 30 is mounted in the thimble 16 and is confined between a shoulder 36 and a retainer ring 38. The rings 34 and 38 may be of the usual split type easily snapped into grooves in the respective elements. It will be noted that the race means 24 is rotatable relative to the thimble 16 but is constrained against axial movement relative thereto, and moves axially with the thimble 16 relative to the inner housing member 14.

The input shaft 18 is mounted in the race means 24 for rotatably driving the latter. The input shaft is connected to drive means (not shown) which, when the mechanism is used in a meter, is the liquid displacement device. The connection between the input shaft and the race means preferably takes the form of a drive bushing 40 suitably secured in a bore 42 in the body 26, as by axially knurling the bushing and press fitting it in the bore. The bushing 40 has a small bore 43 receiving the shaft, and longitudinal grooves 44 receiving ears 46 punched out from the shaft for transmitting the rotational movement of the shaft to the body. The ears and grooves are so dimensioned that the ears are easily and readily received in the grooves, facilitating relative movement of the respective members so that adjustment may be effected. This also permits detachment of the members by a longitudinal separating movement thereof.

The inner housing member 14 preferably is provided with a mounting flange 48 and has at its inner end, an inwardly extending flange 49 serving as confining means for the outer race means which constitutes the counterpart of the inner race 28. The outer race means is made up of two members 50 and 52, the one member 50 being referred to herein as a fixed race and the other as a movable race. Both of these race members are restrained against rotation in and relative to the inner housing member 14, but the fixed race member 50 also remains stationary against axial movement while the movable race member 52 is free to move longitudinally or axially relatively to the inner housing member 14. The member 50 is confined against rotation by means of a pin 54 press fitted in a bore in the flange 49 and extending into a slot 56 in the race member. The member 50 is limited in axial movement in one direction by the flange 49 and in the other by the race member 52 (acting through the balls 74) which is constantly urged yieldably toward the member 50. These two race members form the outer race, and the relative axial movement therebetween is for the purpose of varying the pitch diameter of the outer race by permitting the balls to move up or down on the fixed outer race member in response to corresponding movements of the inner race member 28. The race member 52 is urged toward the race member 50 by a plurality of coiled springs 60 disposed in bores 62 in an extension 64 of the member 52. These springs are best seen in Figs. 2 and 4 and are compressed between the inner ends of the bores and an annular end plate 66 fitted in the housing member and retained in place by a retainer ring 68 of suitable type. The pressure of these springs and the resulting friction between the springs and the end plate 66 restrain the race member 52 against rotation with respect to the housing.

The bearing members 50 and 52 are provided with bearing surfaces 70 and 72 which together form the outer race for the bearing balls 74 which are operatively disposed between the outer race and the inner race 28. The angular relation between the races is of quite precise character, as will be brought out more fully hereinafter, but before describing that aspect of the device, the remainder of the drive to the output shaft 20 will be described. The balls 74 are confined in a ball cage 76 which serves as the means for imparting motion from the balls to the output shaft. The ball cage has an enlarged tubular portion 78 telescoped between the inner and outer races and having holes 80 for receiving the balls, which latter project through the holes on either side for engagement with the inner and outer ball races.

The outer race serves as a reaction surface for the balls 74 in response to rotation of the inner race 28, whereby the balls progress around the inner race in the manner of a planetary system and carry the ball cage 76 therewith in rotation about the axis of rotation of the race 28. The balls are constantly urged into mutually engaged position with the race surfaces by the springs 60 acting on the race member 52. The ball cage 76 has a reduced end 82 having bearing and supporting engagement in the tubular extension 64 of the race member 52. The ball cage has limited axial movement to accommodate the slight necessary axial movement of the balls 74 in the adjustments of the device. The tubular extension 82 of the ball cage has an inward projection 84 similar to a flange in which are formed diametrically opposite grooves 86 for receiving a cross pin 88 fixed in the output shaft 20. The connection here, as respects relative movement, is similar to that described in connection with the input shaft 18, and for the same purpose. The inner end 90 of the output shaft may have longitudinally arcuate surfaces 92 for enabling limited universal movement of the output shaft relatively to the ball cage 76.

Referring again to the inner and outer race and the relationship therebetween, the outer race bearing surfaces 70 and 72 are each of conic shape, tapering in opposite directions and in mutually facing positions. The balls are confined between these two surfaces and the inner race 28. The surfaces 70 and 72 each engage each of the balls at one point, as does the inner race 28, and the balls are accordingly engaged at three points by the surfaces of the races and in that manner confined in the races. This confinement is effective in axial and radial directions, and the balls are maintained in spaced-apart relation in circumferential directions by the ball cage 76.

The variable drive mechanism of the invention is somewhat analogous to a planetary system, the inner ball race corresponding to the sun member, the balls to the planetary members, and the outer race to the oribt member, although in the present case, the variation in the drive ratio is continuous; that is to say, in infinitesimally small increments. In order to produce the variation in ratio it is, of course, necessary to vary the effective dimensions or pitch diameters of the races 28 and 50, 52. When the inner race 28 is adjusted axially relatively to the inner housing member 14, the effective diameter of the race relative to the balls 74 becomes greater or less. Specifically, as the inner race is moved inwardly, a greater-diameter portion of it engages the balls and the input-output speed ratio between the shafts 18 and 20 decreases. Conversely, on outward movement of the inner race, a lesser-diameter portion engages the balls and the input-output ratio decreases. Corresponding changes must occur in the outer race to accommodate the effective changes in diameter of the inner race, and this is accomplished by permitting the balls to move upwardly and outwardly on the outer fixed race, varying the distance in axial direction between the outer race members 50 and 52 which varies the pitch diameter of the outer race. As the outer race members 50 and 52 are moved in separating direction, for example, the conic bearing surfaces 70 and 72 engage the balls at points forming larger pitch diameters (on the surfaces) for providing a corresponding greater pitch diameter of the outer race.

The present device is so constructed that, regardless of the adjustment of the elements to any position of adjustment, the balls rotate in the races without slipping. This result is accomplished by providing a predetermined correlation between the bearing surfaces 70 and 72 and the tapered surface of the inner race 28. More specifically the taper of the race 28 is selected according to the rate of variation desired for a given amount of adjustment, the shape of the surface 70 is determined by the shape of the surface of the inner race, and the shape of the surface 72 is determined by the shape of the surface 70. The surface of the inner race 28 is preferably of low slope so that fine increments of variation in ratio can be effected relative to the extent of movement of the inner race. The surface 70 is of such slope as to facilitate adjustment of the inner race and to maintain firm engagement between the various movable elements. Moreover the slope of the surface 70 must be sufficient to avoid binding or jamming of the balls between the inner race member 28 and the fixed outer race member 50 when the inner race member 28 is moved in an outward direction. The surface 72 is of such shape relative to the other two surfaces as to prevent sliding of the balls thereon.

Referring to the points of engagement between the balls and the races, it will be seen that the balls and the inner race 28 engage at the points 94, the balls and the bearing surface 70 of the outer race engage at the points 96, the balls and the bearing surface 72 of the outer race engage at the points 98. In this arrangement, and considering any arbitrarily selected position of the race members 50 and 52 relative to each other (such as that shown in Fig. 2), the balls 74 rotate in response to rotation of the inner race as they roll around the outer race. The relationship is such that a line on a ball containing all of the points 96, and another line containing all of the points 98, define circles on the ball of such respective magnitudes that the ball rolls on these two lines without slipping with respect to either surface 70 or 72 in response to its being rolled by engagement at the point 94 with the inner ball race 28. It will be understood that the "points" as referred to herein are, from a practical standpoint, actually greater than theoretical points, and constitute areas but only minute areas.

It is not only necessary that such relationship between the balls and the races be maintained in any one given position of adjustment, but substantially the same relationship must be maintained in all positions of adjustment. This is accomplished by the provision of the special angular relation between the bearing surfaces 70 and 72 and the inner ball race 28. One example of the relative dispositions of the various surfaces is as follows, it being understood that the invention is not limited to such exact relations. The conic surface of the inner race 28 forms an angle of 3°15' with the axis of rotation thereof; the conic bearing surface 70 forms an angle of 21°45' with the axis of rotation; and the conic bearing surface 72 forms an angle of 38°15' with the axis of rotation; the angle between the bearing surface 70 and the conic surface of the inner ball race 28 is 18°30'; and the angle between the conic bearing surface 72 and the conic surface of the inner ball race 28 is 35°.

The angle between the bearing surface 70 and the inner ball race 28 is large enough that the balls do not bind upon retraction (to the left) of the inner ball race 28, and on the other hand, this angle is sufficiently small that excessive pressure is not required to be exerted by the movable ball race member 52 toward the other for retaining the balls solidly in place. The outer race member 52 is constantly biased toward the other by the springs 60 which are of such strength to firmly retain the balls in position against the two points 94 and 96 without undue play, but the springs readily yield in retracting direction (to the right) upon movement of the inner race 28 relative to the inner housing member 14 in that direction.

The angles of the conic surfaces referred to above are such that in all positions of adjustment of the movable outer race member 52 substantially the same relationship described exists between the three points 94, 96 and 98 forming the points of engagement between the balls and the inner and outer races. The points 96 and 98 lie on lines 100 that are included in a conic surface having its apex substantially coincident with the apex of the projection of the surface of the inner race 28 (as indicated by lines 102), and the balls 74 rotate on their own axes (indicated by the lines 103) which lie in another conic surface having its apex substantially coincident with the apex of the projection of the surface of the inner race. A certain degree of tolerance is permitted in this respect, although as a practical matter the apexes coincide as mentioned.

As the iner race is adjusted (e. g., moved inwardly) its apex moves in a corresponding direction. However, as the inner race moves as mentioned, the balls 74 move along the surface 70, axially with the inner race, and radially outwardly, forcing the movable race member 52 in the same axial direction. A new position of the balls and movable race member establish new points 96 and 98, but the relation between the two establishes new lines 100 and a corresponding conic surface having its apex substantially coincident with the corresponding new apex of the projection of the surface of the inner race. A similar situation exists with respect to the balls, the balls move in directions noted, and their individual axes of rotation form a new conic surface, displaced relative to its original position, and substantially coincident with the other new apexes mentioned.

In the use of the device as in an instance mentioned between a liquid displacement device and a counter, adjustment may be made in a simple manner by turning the outer housing member, which varies the input-output speed ratio as noted, and this may be done without disturbing the metering operation. Adjustment may be found necessary for various reasons, the principal one of which is the leakage past the seals of the liquid displacement device. Leakage of liquid past the seals of a liquid displacement device occurs because of the impossibility of making perfect seals without causing excessive friction. A thin liquid will leak more than a thick or highly viscous liquid, since thin liquid will more freely pass through the necessary openings or clearance provided to avoid the friction mentioned. When a change is made in the kind of liquid metered by the liquid displacement device, an appropriate adjustment must be made in the drive to correct for any change in viscosity so that the counter employed will accurately register the number of units (e. g., gallons) metered. Assuming a highly viscous liquid is being metered, and a change is made to thin liquid, in the case of the thin liquid, the liquid will more freely leak as mentioned, and more liquid may pass through the liquid displacement device for every gallon registered by the counter. An adjustment is made in such case, to decrease the input-output speed ratio, by moving the inner race 28 inwardly sufficient to cause the counter to correctly indicate the amount of liquid passing through the meter. When a change is made from thin to thick liquid, a similar but reverse discrepancy in the gallons registered occurs, and an appropriate adjustment in the opposite direction is made.

The scale 22 includes a plurality of uniformly spaced scale division marks 22a arranged in a series extending longitudinally along the inner housing member 14 in position to register successively with the inner end of the thimble 16 as the latter is adjustably moved relatively to the inner housing member. These markings are arranged to indicate in integers, the percentage variation in drive ratio as the members 14 and 16 are moved relatively to effect an adjustment in such ratio. The scale 22 also includes a plurality of uniformly spaced scale markings 22b arranged in a series extending circumferentially around the thimble at the inner end portion thereof. The inner housing member is provided with a longitudinally extending line 22c providing a reference line with which the scale markings 22b cooperate. The markings 22a and 22b are so arranged that the latter indicate increments of movement of the thimble in the inner housing in decimal fractions of the increments of movement indicated by each scale division of the scale markings 22b.

By way of illustration the adjuster illustrated in Fig. 1 of the drawings is shown as adjusted to a setting providing a 2.5% variation in the drive ratio relatively to the setting of the adjuster wherein the inner edge of the thimble is coincident with the 0 mark on the inner housing member or the "zero" setting of the adjuster.

The device is unusually accurate since there is no slipping between the elements as described; it is continuously or infinitely variable, with corresponding accuracy in adjustment; it is capable of extremely fine adjustments; the device is free of backlash and reversible without loss of accuracy.

I claim:

1. A device of the character disclosed comprising housing means including a tubular inner housing member and an outer thimble threaded thereon for relative axial adjusting movement, inner race means including a body portion mounted in the outer thimble for rotation but restrained axially and having a conic portion forming an inner race extending axially into the inner housing member with its small end leading thereinto and movable axially therein in response to adjusting movements of the thimble on the inner housing member, the body portion having means for connection with an input shaft, outer race means mounted in the inner housing member including a pair of race members both fixed rotationally and one fixed and the other movable axially and having interfacing conic surfaces together forming an outer ball race, the fixed race member being proximate the large end of the inner race and the movable race member being proximate the small end, the movable race member having a tubular extension, spring means between the tubular extension and the adjacent end of the housing member yieldingly biasing the movable race member toward the other and fixed race member, and rotatable ball cage means within the outer race members having a tubular ball cage and balls therein engaging the races and having a tubular extension with bearing support in the extension of the movable race member and also having means for detachable connection of an output shaft thereto.

2. An infinitely variable planetary transmission comprising a housing including a first tubular housing member and a second tubular housing member threadedly telescoped in said first tubular housing member, a first shaft journaled in and restrained against axial movement with respect to one of said housing members and having a conic portion disposed within said housing and serving as an inner ball race, a pair of outer race members having surfaces defining an outer ball race, one of said outer race members being secured to the other of said housing members, the other of said outer race members being slidable axially in said other housing member but restrained against rotation with respect thereto, a plurality of balls disposed between and bearing against said inner and outer races, a second shaft disposed coaxially with said first shaft, a ball cage drivingly connecting said second shaft and said balls, said first shaft being movable axially with respect to said other housing member to force said balls radially outwardly and to permit said balls to move radially inwardly, means urging said outer races resiliently toward each other, whereby the race-defining surfaces thereof remain in contact with said balls as said first mentioned shaft is moved axially, said race-defining surfaces of said outer races being conic whereby the points of engagement of said outer race members and said balls remain at constant distances from the instantaneous axis of rotation of said balls as said first shaft moves axially to effect radial movement of said balls, said second housing member having thereon a scale including a series of circumferentially extending scale markings uniformly spaced axially thereof and registering successively with the end edge of said first housing member for designating the relative axial positions of said housing members and consequently the speed ratio of said second shaft relatively to said first shaft.

3. An infinitely variable planetary transmission comprising a housing including a first tubular housing member and a second tubular housing member threadedly telescoped in said first tubular housing member, a first shaft journaled in and restrained against axial movement with respect to one of said housing members and having a conic portion disposed within said housing and serving as an inner ball race, a pair of outer race members having surfaces defining an outer ball race, one of said outer race members being secured to the other of said housing members, the other of said outer race members being slidable axially in said other housing member but restrained against rotation with respect thereto, a plurality of balls disposed between and bearing against said inner and outer races, a second shaft disposed coaxially with said first shaft, a ball cage drivingly connecting said second shaft and said balls, said first shaft being movable axially with respect to said other housing member to force said balls radially outwardly and to permit said balls to move radially inwardly, means urging said outer races resiliently toward each other, whereby the race-defining surfaces thereof remain in contact with said balls as said first mentioned shaft is moved axially, said race-defining surfaces of said outer races being conic and so arranged that the apices of a cone passing through the lines of contact between said balls and the surfaces of said outer races and of a cone including the instantaneous axes of rotation of said balls and of a cone including the surface of said inner race are substantially coincident in all positions of adjustment of said first shaft.

References Cited in the file of this patent

UNITED STATES PATENTS

| | | |
|---|---|---|
| 347,844 | Asher | Aug. 24, 1886 |
| 1,298,560 | Poppink | Mar. 25, 1919 |
| 1,380,006 | Nielsen | May 31, 1921 |
| 1,718,846 | Arter | June 25, 1929 |
| 1,976,407 | Morgan | Oct. 9, 1934 |
| 2,005,949 | Morgan | June 25, 1935 |

FOREIGN PATENTS

| | | |
|---|---|---|
| 460,384 | Germany | May 29, 1928 |
| 732,021 | France | June 6, 1932 |
| 794,188 | France | Dec. 2, 1935 |